US009051881B2

(12) United States Patent
Bettner

(10) Patent No.: US 9,051,881 B2
(45) Date of Patent: Jun. 9, 2015

(54) ELECTRICAL POWER GENERATION AND WINDMILL STARTING FOR TURBINE ENGINE AND AIRCRAFT

(75) Inventor: James Lee Bettner, Pittsboro, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 662 days.

(21) Appl. No.: 13/335,477

(22) Filed: Dec. 22, 2011

(65) Prior Publication Data

US 2012/0167590 A1 Jul. 5, 2012

Related U.S. Application Data

(60) Provisional application No. 61/427,724, filed on Dec. 28, 2010.

(51) Int. Cl.
*F02C 7/275* (2006.01)
*F02C 7/262* (2006.01)
*F02C 7/32* (2006.01)

(52) U.S. Cl.
CPC ............... *F02C 7/275* (2013.01); *F02C 7/262* (2013.01); *F02C 7/32* (2013.01); *F05D 2220/76* (2013.01); *Y02T 50/671* (2013.01)

(58) Field of Classification Search
CPC ............ F02C 7/268; F02C 7/262; F02C 7/32; H02K 7/1823; F01D 15/10
USPC ........ 60/786, 788, 802, 39.13, 226.1; 290/47; 244/53 A
See application file for complete search history.

(56) References Cited

U.S. PATENT DOCUMENTS

| 4,062,185 | A | * | 12/1977 | Snow | 60/204 |
|---|---|---|---|---|---|
| 4,062,186 | A | * | 12/1977 | Snow et al. | 60/226.1 |
| 4,912,921 | A | | 4/1990 | Rice et al. | |
| 5,694,765 | A | | 12/1997 | Hield et al. | |
| 5,845,483 | A | * | 12/1998 | Petrowicz | 60/788 |
| 6,467,725 | B1 | * | 10/2002 | Coles et al. | 244/58 |
| 6,851,267 | B2 | | 2/2005 | Bruno et al. | |
| 6,895,741 | B2 | | 5/2005 | Rago et al. | |
| 7,481,062 | B2 | | 1/2009 | Gaines et al. | |
| 7,514,810 | B2 | | 4/2009 | Kern et al. | |
| 7,802,757 | B2 | * | 9/2010 | Dooley et al. | 244/60 |
| 8,291,716 | B2 | * | 10/2012 | Foster et al. | 60/788 |
| 2005/0188704 | A1 | * | 9/2005 | Butt | 60/778 |
| 2006/0042252 | A1 | * | 3/2006 | Derouineau | 60/703 |
| 2006/0174629 | A1 | | 8/2006 | Michalko | |

(Continued)

FOREIGN PATENT DOCUMENTS

EP 1908941 A2 4/2008

OTHER PUBLICATIONS

International Search Report and Written Opinion, PCT/US11/67123, Rolls-Royce Corporation, Apr. 26, 2012.

(Continued)

*Primary Examiner* — Gerald L Sung
(74) *Attorney, Agent, or Firm* — Krieg DeVault LLP

(57) ABSTRACT

One embodiment of the present invention is a unique gas turbine engine. Another embodiment is a unique aircraft. Other embodiments include apparatuses, systems, devices, hardware, methods, and combinations for gas turbine engines and gas turbine engine powered aircraft. Further embodiments, forms, features, aspects, benefits, and advantages of the present application will become apparent from the description and figures provided herewith.

16 Claims, 2 Drawing Sheets

(56) References Cited

U.S. PATENT DOCUMENTS

| | | |
|---|---|---|
| 2007/0022735 A1 | 2/2007 | Henry et al. |
| 2007/0101696 A1 | 5/2007 | Dooley |
| 2007/0151258 A1 | 7/2007 | Gaines et al. |
| 2008/0072568 A1* | 3/2008 | Moniz et al. ............ 60/226.1 |
| 2008/0098715 A1* | 5/2008 | Orlando et al. .......... 60/226.1 |
| 2009/0007569 A1 | 1/2009 | Lemmers, Jr. et al. |
| 2009/0115295 A1 | 5/2009 | Colin |
| 2009/0211260 A1 | 8/2009 | Kesseli et al. |
| 2009/0314002 A1* | 12/2009 | Libera et al. ............ 60/778 |
| 2010/0039075 A1 | 2/2010 | Trainer et al. |

OTHER PUBLICATIONS

Extended European search report in corresponding European patent application (i.e., EP 11 85 3700), mailed Mar. 17, 2015 (7 pages).

* cited by examiner

ELECTRICAL POWER GENERATION AND WINDMILL STARTING FOR TURBINE ENGINE AND AIRCRAFT

CROSS REFERENCE TO RELATED APPLICATIONS

The present application claims benefit of U.S. Provisional Patent Application No. 61/427,724, filed Dec. 28, 2010, entitled AIRCRAFT AND GAS TURBINE ENGINE, which is incorporated herein by reference.

GOVERNMENT RIGHTS

The present application was made with the United States government support under Contract No. F33615-03-D-2357 0004, awarded by the U.S. Air Force. The United States government may have certain rights in the present application.

FIELD OF THE INVENTION

The present invention relates to aircraft and gas turbine engines, and more particularly, to electrical power generation and windmill starting in gas turbine engine powered aircraft.

BACKGROUND

Gas turbine engines and aircraft powered by gas turbine engines that generate power for the aircraft and are required to perform windmill starts remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique aircraft. Other embodiments include apparatuses, systems, devices, hardware, methods, and combinations for gas turbine engines and gas turbine engine powered aircraft. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
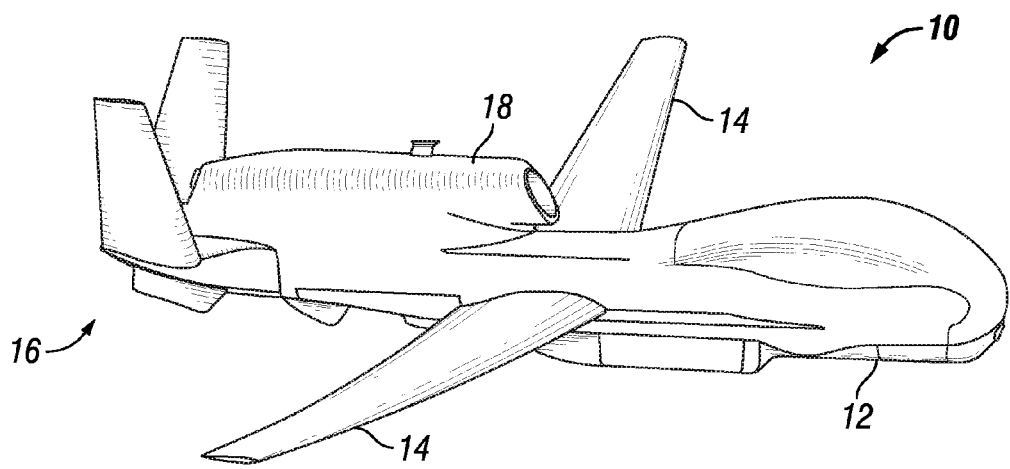
FIG. 1 illustrates some aspects of a non-limiting example of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of an aircraft 10 in accordance with an embodiment of the present invention. In one form, aircraft 10 includes flight structures in the form of a fuselage 12, wings 14 and an empennage 16. Aircraft 10 also includes a gas turbine propulsion system 18. In one form, aircraft 10 is an unmanned single engine air vehicle. In other embodiments, aircraft 10 may be any fixed-wing aircraft, including turbofan aircraft, turbojet aircraft and turboprop aircraft. In still other embodiments, aircraft 10 may be a rotary-wing aircraft, a combination rotary-wing/fixed-wing aircraft, a missile, or any air vehicle. In various embodiments, aircraft 10 may have a single propulsion engine or a plurality of propulsion engines. In addition, in various embodiments, aircraft 10 may employ any number of wings 14. Empennage 16 may employ a single or multiple flight control surfaces.

Figure 2:
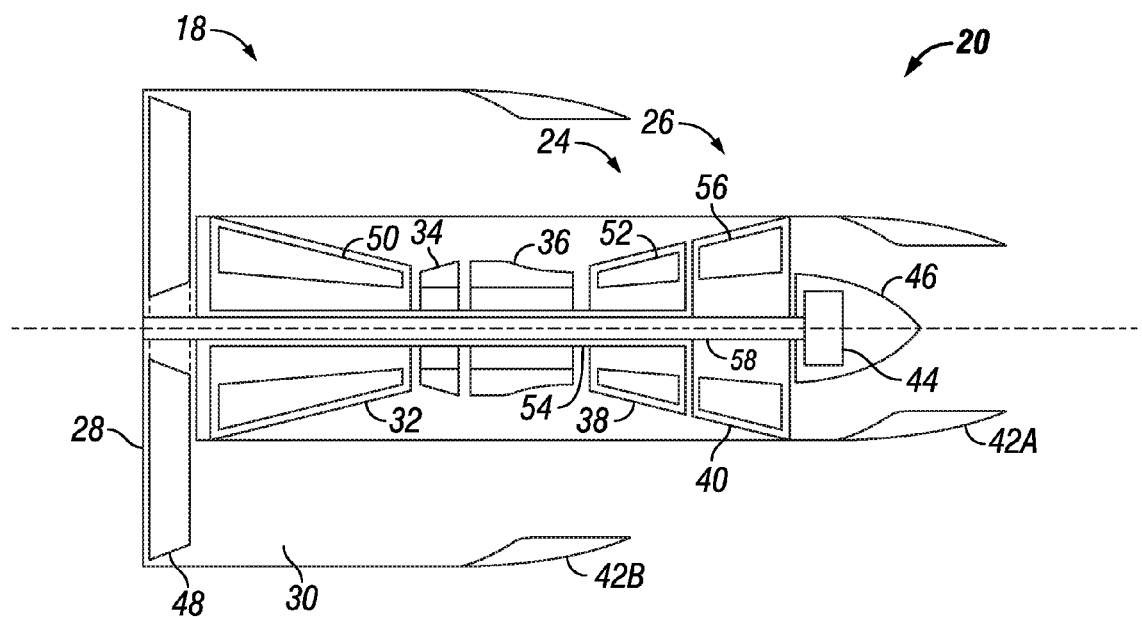
FIG. 2 schematically illustrates some aspects of non-limiting example of a gas turbine engine in accordance with an embodiment of the present invention.

Referring to FIG. 2, there are illustrated some aspects of a non-limiting example of a propulsion system 18 in accordance with an embodiment of the present invention. Propulsion system 18 includes a gas turbine engine 20. Engine 20 is a primary propulsion engine that provides thrust for flight operations of aircraft 10. In one form, engine 20 is a two spool engine having a high pressure (HP) spool 24 and a low pressure (LP) spool 26. In other embodiments, engine 20 may include three or more spools, e.g., may include an intermediate pressure (IP) spool and/or other spools. In one form, engine 20 is a turbofan engine, wherein LP spool 26 is operative to drive a propulsor 28 in the form of a turbofan (fan) system, which may be referred to as a turbofan, a fan or a fan system. In other embodiments, engine 20 may be a turboprop engine, wherein LP spool 26 powers a propulsor 28 in the form of a propeller system (not shown), e.g., via a reduction gearbox (not shown). In yet other embodiments, LP spool 26 powers a propulsor 28 in the form of a propfan. In still other embodiments, propulsor 28 may take other forms, such as one or more helicopter rotors or tilt-wing aircraft rotors. In one form, a single propulsion system 18 is coupled to fuselage 12 of aircraft 10. In other embodiments, one or more propulsion system 18 may be coupled to each wing 14. In still other embodiments, one or more propulsion systems 18 may be coupled to the fuselage and/or the empennage in addition to or in place of wing-mounted propulsion systems 18.

In one form, engine 20 includes, in addition to fan system 28, a bypass duct 30, a compressor system 32, a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. Engine 20 also includes an electrical rotor machine 44 and a tail cone 46. Electrical rotor machine 44 is coupled to LP spool 26. In one form, electrical rotor machine 44 is integrated within engine tail cone 46. In other embodiments, electrical rotor machine 44 may be disposed in other locations, for example and without limitation, upstream or downstream of propulsor 28, or otherwise upstream of combustion system 36, e.g., in order to provide a cooler environment for electrical rotor machine 44. In one form, electrical rotor machine 44 is configured to convert mechanical power to electrical power. In other embodiments, electrical rotor machine 44 may also be configured to convert electrical power to mechanical power, e.g., as in a motor/generator.

In the depicted embodiment, engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor system 32 are in fluid communication with fan system 28. Nozzle 42B is in fluid communication with bypass duct 30. Diffuser 34 is in fluid communication with compressor system 32. Combustion system 36 is fluidly disposed between compressor system 32 and turbine system 38. Turbine system 40 is fluidly disposed between turbine system 38 and nozzle 42A. In one form, combustion system 36 includes a combustion liner (not shown) that contains a continuous combustion process. In other embodiments, combustion system 36 may take other forms, and may be, for example, a wave rotor combustion system, a rotary valve combustion system, a pulse detonation combustion system or a slinger combustion system, and may employ deflagration and/or detonation combustion processes.

Fan system 28 includes a fan rotor system 48 driven by LP spool 26. In various embodiments, fan rotor system 48 includes one or more rotors (not shown) that are powered by turbine system 40. Fan system 28 may include one or more vanes (not shown). Bypass duct 30 is operative to transmit a bypass flow generated by fan system 28 around the core of engine 20. Compressor system 32 includes a compressor rotor system 50. In various embodiments, compressor rotor system 50 includes one or more rotors (not shown) that are powered by turbine system 38. Turbine system 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine system 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. Turbine system 40 is operative to discharge the engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air, and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58. The hot gases exiting turbine system 40 are discharged through nozzle system 42A, and provide a component of the thrust output by engine 20.

Figure 3:
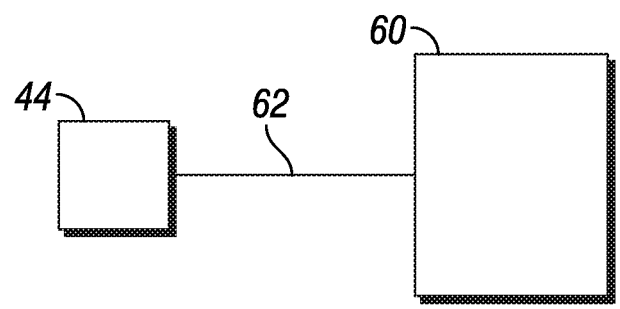
FIG. 3 schematically illustrates some aspects of a non-limiting example of an electrical rotor machine coupled to an aircraft electrical system in accordance with an embodiment of the present invention.

Referring to FIG. 3, aircraft 10 includes an electrical system 60 having an electrical bus 62. Electrical system 60 may include, for example and without limitation, avionics and other aircraft control systems; intelligence data collection systems such as various sensor payloads, synthetic aperture radar (SAR) systems, electro-optical/infrared (EO/IR) imagery; command, communication and control uplink and downlink systems; and weapon systems. Electrical rotor machine 44 is coupled to electrical system 60 via electrical bus 62. One or more electrical power conditioning devices or other electrical or electronic devices (not shown) may be disposed between electrical rotor machine 44 and electrical bus 62, e.g., to convert the electrical power output by electrical rotor machine 44 into a form suitable for use on electrical bus 62 and by electrical system 60.

The inventors have determined that during normal flight operations at high altitude, e.g., 60,000 feet and 0.6 Mach number, extracting power from LP spool 26 to supply aircraft 10 with electrical power results in a lower thrust reduction than if the same amount of power was extracted from HP spool 24. In a particular example, the thrust reduction was reduced by a factor of four (4). In addition, the inventors have determined that the adverse effect on thrust specific fuel consumption (TSFC) is lower. That is, extracting power from LP spool 26 to supply aircraft 10 with electrical power results in a smaller adverse impact on TSFC than if the same amount of power was extracted from HP spool 24. In a particular example, the adverse impact was reduced by a factor of two (2). Accordingly, in one form, electrical rotor machine 44 is configured to provide electrical power to aircraft 10 during flight operations, including providing power to electrical system 60. In other embodiments, other power sources may be used in addition to or in place of electrical rotor machine 44 to power aircraft 10 during flight operations.

Figure 4:
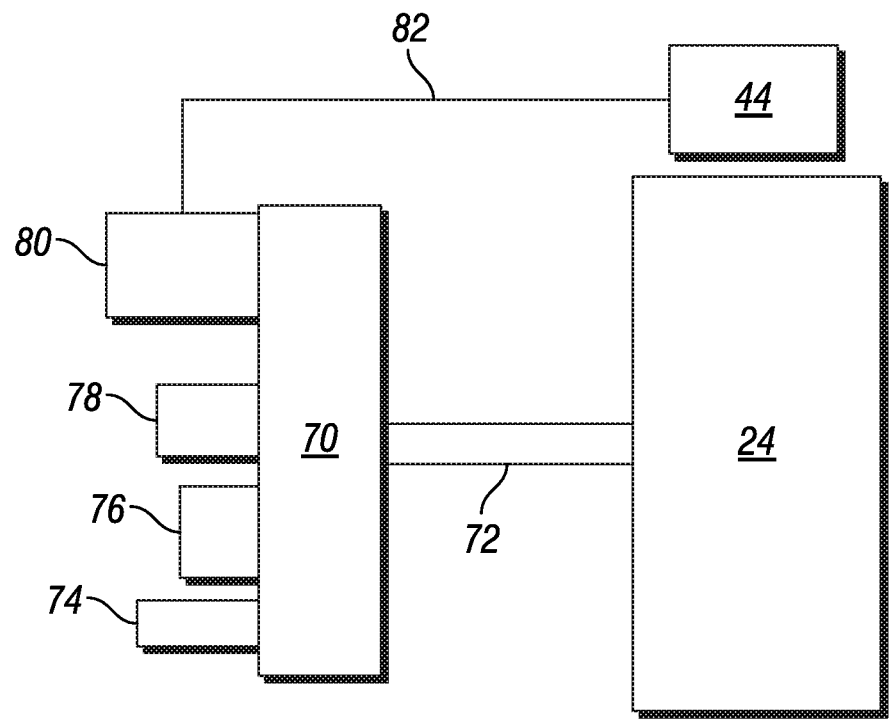
FIG. 4 schematically illustrates some aspects of a non-limiting example of an accessory gearbox of the gas turbine engine embodiment of FIG. 2 having a starter motor coupled to the electrical rotor machine of FIG. 3 for starting the gas turbine engine.

Referring to FIG. 4, engine 20 also includes an accessory gearbox 70. Accessory gearbox 70 is mechanically coupled to HP spool 24 via a shafting system 72. Accessory gearbox 70 is configured to drive a plurality accessories mounted thereon, including, for example and without limitation, a lube pump 74, a hydraulic pump 76, and a fuel pump and metering unit 78. Also mounted on accessory gearbox 70 is an electrical rotor machine 80. In one form, electrical rotor machine 80 is configured to convert electrical power into mechanical power. In a particular form, electrical rotor machine 80 is a starter motor. Electrical rotor machine 80 is configured to supply sufficient mechanical power to HP spool 24 via accessory gearbox 70 and shafting system 72 to impart sufficient rotation to HP spool 24 to start engine 20. In other embodiments, electrical rotor machine 80 may also or alternatively be configured to convert mechanical power into electrical power, and may be, for example and without limitation, a starter/generator, a generator or an alternator.

During flight operations of aircraft 10, events may occur that result in engine 20 shutting down. For example, engine 20 may be commanded to shut down under certain circumstances, or an uncommanded shutdown of engine 20 may occur, e.g., a flameout resulting from adverse ambient and/or engine 20 inlet conditions. In such cases, it is desirable to restart engine 20. Many aircraft, such as aircraft 10 employ engines that are started via a ground cart that supplies electrical energy or pressurized air for a pneumatic starter. However, once airborne, such facilities may not be available. In order to reduce aircraft weight, many aircraft, such as aircraft 10, do not retain onboard batteries for effecting an in-flight engine start. Rather, many aircraft rely on conventional windmill starting techniques, wherein during the windmilling event, the aircraft is guided to increase its velocity, resulting in increased air velocity through the engine. The increased air velocity is employed to impart sufficient rotational velocity to the high pressure spool to allow fuel introduction and ignition, thereby performing an in-flight engine start.

However, some aircraft, such as aircraft 10, have configurations that prevent a conventional windmill start, e.g., due to adverse engine inlet conditions, and/or flight at high altitudes, which may be less conducive to rotating the high pressure spool sufficiently for a windmill start. In order to overcome such deficiencies, some embodiments of the present invention provide a nonconventional windmill start for the propulsion engines. For example, electrical rotor machine 44 is configured to extract mechanical power from LP spool 26 during a windmilling event, convert the mechanical power to electrical power, and supply the electrical power to HP spool 24 for use in effecting a windmill start of engine 20. Because propulsor 28 rotates with LP spool 26, and because propulsor 28 has a substantially larger diameter than HP spool 24, LP spool 26 is able to extract a substantial amount of power from the air rushing through propulsor 28. This power is captured by electrical rotor machine 44 and converted to electrical power. As illustrated in FIG. 4, electrical rotor machine 44 is electrically coupled to electrical rotor machine 80, as indicated by line 82. Switches, conditioning units and/or control systems (not shown) may be electrically disposed between electrical rotor machine 44 and electrical rotor machine 80, depending upon the application. The electrical power generated by electrical rotor machine 44 is supplied to electrical rotor machine 80. Electrical rotor machine 80 is configured and operative to supply mechanical power to rotate HP spool 24, using the electrical power generated by electrical rotor machine 44, during a windmill event to achieve sufficient rotational velocity to inject and ignite fuel in combustion system 36 and to start engine 20.

Embodiments of the present invention include a gas turbine engine, comprising: a first spool configured as a high pressure spool; a second spool configured to operate at lower pressures than the high pressure spool; an electrical rotor machine coupled to the second spool, wherein the electrical rotor machine is configured to extract mechanical power from the second spool during a windmilling event, convert the mechanical power to electrical power, and supply the electrical power to the first spool for use in effecting a windmill start of the gas turbine engine.

In a refinement, the electrical rotor machine is configured to supply electrical power to an aircraft during normal gas turbine engine operation.

In another refinement, the gas turbine engine further comprises a starter motor configured to rotate the first spool for starting the gas turbine engine, wherein the electrical power is supplied from the electrical rotor machine to the starter motor.

In yet another refinement, the gas turbine engine further comprises an accessory gearbox, wherein the starter motor is mounted on the accessory gearbox and operative to supply mechanical power to the first spool via the accessory gearbox for effecting the windmill start of the gas turbine engine.

In still another refinement, the starter motor is configured as a starter/generator.

In yet still another refinement, the gas turbine engine further comprises an engine tail cone, wherein the electrical rotor machine is positioned within the engine tail cone.

In a further refinement, the gas turbine engine is configured as a two-spool engine, wherein the second spool is configured as a low pressure spool.

In a yet further refinement, the gas turbine engine is a turbofan engine, and the second spool includes a turbofan.

In a still further refinement, the gas turbine engine is configured as a three-spool engine having the high pressure spool, an intermediate pressure spool and a low pressure spool, wherein the second spool is configured as the low pressure spool.

Embodiments of the present invention include a gas turbine engine, comprising: a fan rotor; a high pressure spool; an electric starter coupled to the high pressure spool and configured to rotate the high pressure spool to start the gas turbine engine; and an electrical rotor machine coupled to the fan rotor and configured to extract mechanical power from the fan rotor during a windmilling event, convert the mechanical power to electrical power, and supply the electrical power to the electric starter for use in effecting a windmill start of the gas turbine engine.

In a refinement, the gas turbine engine further comprises an accessory gearbox.

In another refinement, the electric starter is mounted on the accessory gearbox.

In yet another refinement, the gas turbine engine further comprises an engine tail cone, wherein the electrical rotor machine is integrated into the engine tail cone.

In still another refinement, the electrical rotor machine is configured to extract mechanical power from the fan rotor and supply electrical power to an aircraft during normal flight operations.

In yet still another refinement, the gas turbine engine is configured as a two spool engine.

Embodiments of the present invention include an aircraft, comprising: a flight structure; and a gas turbine engine having a first spool and a propulsor coupled to the first spool; an electrical rotor machine coupled to the first spool and configured to extract mechanical power from the first spool, convert the mechanical power to electrical power, and to supply electrical power to the aircraft during flight operations as the sole source of electrical power for the aircraft.

In a refinement, the gas turbine engine has a high pressure spool; and wherein the electrical rotor machine is configured to supply the electrical power to the high pressure spool for use in effecting a windmill start of the gas turbine engine subsequent to an in-flight shutdown.

In another refinement, the aircraft further comprises a starter motor configured to rotate the high pressure spool for starting the gas turbine engine, wherein the electrical power is supplied from the electrical rotor machine to the high pressure spool to effect the windmill start of the gas turbine engine.

In yet another refinement, the first spool is a low pressure spool.

In still another refinement, the gas turbine engine includes an engine tail cone; and wherein the electrical rotor machine is integrated into the engine tail cone.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A single engine air vehicle, comprising:
a gas turbine engine, wherein the gas turbine engine includes:
a first spool configured as a high pressure spool;
a second spool configured to operate at lower pressures than the high pressure spool; and
a single electrical rotor machine coupled to the second spool,
wherein the electrical rotor machine is configured to extract mechanical power from the second spool during a windmilling event, convert the mechanical power to electrical power, and supply the electrical power to the first spool for use in effecting a windmill start of the gas turbine engine;
wherein the single electrical rotor machine is configured to supply electrical power to the air vehicle during normal gas turbine engine operation as the sole source of electrical power for the air vehicle.

2. The single engine air vehicle of claim 1, further comprising a starter motor configured to rotate the first spool for starting the gas turbine engine, wherein the electrical power is supplied from the electrical rotor machine to the starter motor.

3. The single engine air vehicle of claim 2, further comprising an accessory gearbox, wherein the starter motor is mounted on the accessory gearbox and operative to supply mechanical power to the first spool via the accessory gearbox for effecting the windmill start of the gas turbine engine.

4. with The single engine air vehicle claim 1, wherein the starter motor is configured as a starter/generator.

5. The single engine air vehicle of claim 1, further comprising an engine tail cone, wherein the electrical rotor machine is positioned within the engine tail cone.

6. The single engine air vehicle of claim 1, configured as a two-spool engine, wherein the second spool is configured as a low pressure spool.

7. The single engine air vehicle of claim 5, wherein the gas turbine engine is a turbofan engine, and wherein the second spool includes a turbofan.

8. The single engine air vehicle of claim 1, wherein the gas turbine engine is configured as a three-spool engine having the high pressure spool, an intermediate pressure spool and a low pressure spool, wherein the second spool is configured as the low pressure spool.

9. A single engine air vehicle, comprising:
a gas turbine engine, wherein the gas turbine engine includes:
a fan rotor;
a high pressure spool;
an electric starter coupled to the high pressure spool and configured to rotate the high pressure spool to start the gas turbine engine; and
a single electrical rotor machine coupled to the fan rotor and configured to extract mechanical power from the fan rotor during a windmilling event, convert the mechanical power to electrical power, and supply the electrical power to the electric starter for use in effecting a windmill start of the gas turbine engine and to supply electrical power to the air vehicle during normal flight operations as the sole source of electrical power for the air vehicle;
further comprising an accessory gearbox;
wherein the electric starter is mounted on the accessory gearbox and operative to supply mechanical power to the first spool via the accessory gearbox for effecting the windmill start of the gas turbine engine.

10. The single engine air vehicle of claim 9, further comprising an engine tail cone, wherein the electrical rotor machine is integrated into the engine tail cone.

11. The single engine air vehicle of claim 9, configured as a two spool engine.

12. A single engine aircraft, comprising:
a flight structure; and
a gas turbine engine having a first spool and a propulsor coupled to the first spool;
a single electrical rotor machine coupled to the first spool and configured to extract mechanical power from the first spool, convert the mechanical power to electrical power, and to supply electrical power to the single engine aircraft during flight operations as the sole source of electrical power for the aircraft.

13. The single engine aircraft of claim 12, wherein the gas turbine engine has a high pressure spool; and wherein the electrical rotor machine is configured to supply the electrical power to the high pressure spool for use in effecting a windmill start of the gas turbine engine subsequent to an in-flight shutdown.

14. The single engine aircraft of claim 13, further comprising a starter motor configured to rotate the high pressure spool for starting the gas turbine engine, wherein the electrical power is supplied from the electrical rotor machine to the high pressure spool to effect the windmill start of the gas turbine engine.

15. The single engine aircraft of claim 12, wherein the first spool is a low pressure spool.

16. The single engine aircraft of claim 12, wherein the gas turbine engine includes an engine tail cone; and wherein the electrical rotor machine is integrated into the engine tail cone.

* * * * *